G. QUANONNE.
PROCESS FOR PROTECTING PROPELLING GEAR AND OTHER APPARATUS ON SHIPBOARD FROM AIR USED FOR FACILITATING THE PROPULSION.
APPLICATION FILED JULY 1, 1904.

904,992.

Patented Nov. 24, 1908.
2 SHEETS—SHEET 1.

WITNESSES
W. P. Burk
M. Petit

INVENTOR
Gustave Quanonne
By Richards
Attorneys

G. QUANONNE.
PROCESS FOR PROTECTING PROPELLING GEAR AND OTHER APPARATUS ON SHIPBOARD FROM AIR USED FOR FACILITATING THE PROPULSION.
APPLICATION FILED JULY 1, 1904.

904,992.

Patented Nov. 24, 1908.
2 SHEETS—SHEET 2.

Fig. 17ª.

WITNESSES
W. P. Burk

INVENTOR
Gustave Quanonne
BY Richards
ATTYS

UNITED STATES PATENT OFFICE.

GUSTAVE QUANONNE, OF HOUDENG-GOEGNIES, BELGIUM.

PROCESS FOR PROTECTING PROPELLING-GEAR AND OTHER APPARATUS ON SHIPBOARD FROM AIR USED FOR FACILITATING THE PROPULSION.

No. 904,992.  Specification of Letters Patent.  Patented Nov. 24, 1908.

Application filed July 1, 1904. Serial No. 215,004.

*To all whom it may concern:*

Be it known that I, GUSTAVE QUANONNE, a subject of the King of Belgium, residing at Houdeng-Goegnies, in the Kingdom of Belgium, have invented a certain new and useful Process for Protecting Propelling-Gear and other Apparatus on Shipboard from Air Used for Facilitating the Propulsion, of which the following is a specification.

This invention relates to a method for use on board ships, the propulsion of which is facilitated by introducing a layer of air between the ship's hull and the water.

Experience has shown that when a ship is provided with apparatus by means of which a layer of air can be forced into the water, the air and the froth or foam produced have an unfavorable influence on the machinery in general, and on certain apparatus used on board, for the operation of which water is sucked in from the sea. This is, for instance, the case when froth instead of solid water enters the condenser and the efficiency of the propeller is appreciably reduced by the presence of air.

The object of the present invention is to remove these disadvantages and to protect the machinery, steering gear, propelling gear and other apparatus from air and froth.

The method which is, according to the present invention, used for the purpose referred to, substantially consists in deflecting the air injected into the water from the paths or directions pursued by the water flowing to the apparatus to be protected, for instance to the condenser, the screw propeller or paddle-wheels and the rudder. In the practical execution of this method the water to be used inside the vessel may be sucked in outside the zone within which the layer of air is formed, or the said zone can be interrupted at suitable places in such a manner that the paths taken by the air do not traverse the parts to be protected from air, or blades or other guides of suitable shape can be so arranged as to direct the air in a certain manner.

The invention is illustrated in the accompanying drawings, in which—

Figure 1:
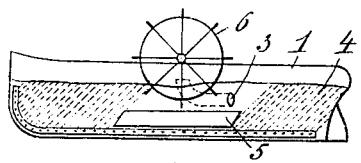
Figure 2:
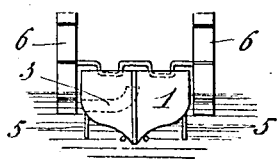
Figure 3:
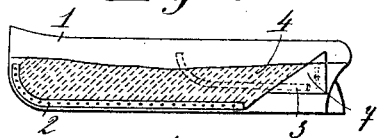
Figure 4:
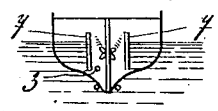
Figure 5:
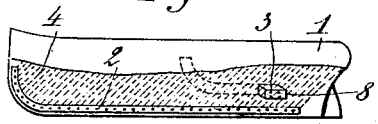
Figure 6:
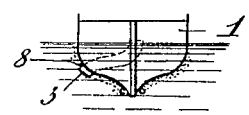
Figure 7:
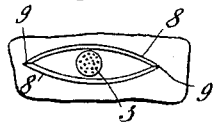
Figure 9:
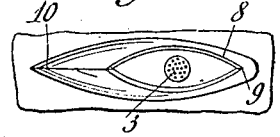
Figure 11:
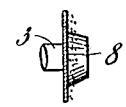
Figure 8:
Figure 10:
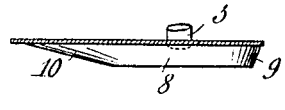
Figure 12:
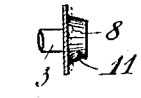
Figure 13:
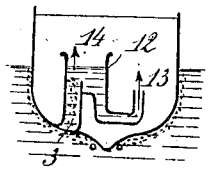
Figure 14:
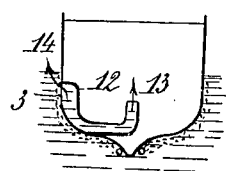
Figure 15:
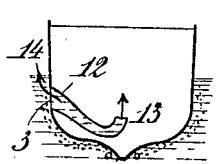
Figure 16:
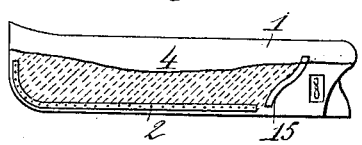
Figure 17:
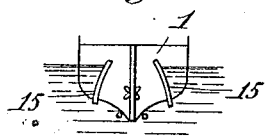
Figure 18:
Figure 19:
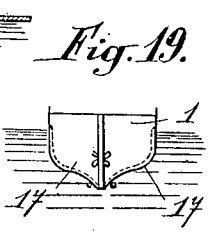
Figure 20:
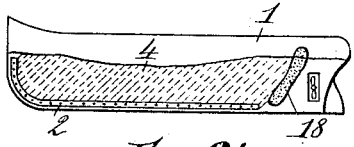
Figure 21:
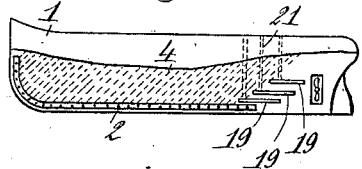
Figure 22:
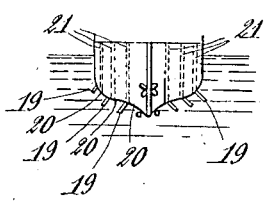

Figure 1 is a diagrammatic view and Fig. 2 an end view of a ship provided with means for carrying out the invention. Figs. 3 and 4 are like views showing a modification. Figs. 5 and 6 are like views of another modification. Figs. 7 and 8 are respectively a plan view and a side view of a deflecting device. Figs. 9, 10 and 11 are respectively a plan view, a side view and a front view of another form of deflecting device. Fig. 12 is a front view of a modification of the device shown in Fig. 11. Figs. 13, 14 and 15 are transverse sections of a ship showing the manner of deflecting the air inside the ship. Fig. 16 is a diagrammatic view and Fig. 17 an end view of a still further modification of carrying out the invention. Fig. 17$^a$ is a sectional view of the special form of blades shown in Figs. 16 and 17. Figs. 18 and 19 are like views of another modification. Fig. 20 is a diagrammatic view of another modification. Fig. 21 is a diagrammatic view and Fig. 22 an end view of a still further modification.

The ship is provided with an air blast apparatus (not shown) and a conduit 2 for the distribution of air and also a conduit 3 through which water for the condenser of the engine is sucked in in front of the air layer 4 indicated by cross hatchings which is provided by the conduit 2. To prevent the access of air to the paddle wheel 6 and to the orifice of the conduit 3 wings or blades 5 are provided as shown in Figs. 1 and 2.

When the invention is applied to a screw steamer, as shown in Figs. 3 and 4, the air is deflected from the propeller, the rudder and the water conduit by means of wings 7, and the air distributing tube 2 terminates some distance in front of the stern of the ship, as shown in Fig. 3. The desired result is thus obtained partly by means of the force which causes the air to ascend and partly by means of the wings 7.

In the example illustrated in Figs. 5 and 6 the air is deflected from the water flowing into the vessel at 3 by means of a projecting nozzle 8 surrounding the mouth of the pipe in such a manner that the air ascending along the side of the vessel is caused to pass around the mouth of the pipe instead of being free to get in front of said mouth.

Figs. 7 to 12 illustrate various devices of the same kind, in which however, the projecting nozzle has been given more suitable shape.

In the form of construction shown in Figs. 7 and 8 for instance, the nozzle 8 consists of two curved plates fixed together at their edges 9 in such a manner that the nozzle can cut more easily through the water and that the frictional resistance to the movement of the ship is reduced without deflecting air to the space in front of the perforated plate which closes the orifice of pipe 3, as may occasionally occur with the device shown in Fig. 5. The form of construction shown in Figs. 7 and 8, is, however, less perfect than the one shown in front view, plan view and side view in Figs. 9, 10 and 11 respectively. The latter is designed to prevent engagement of the projecting nozzle with bridge piles, anchoring piles and the like in harbor. For this purpose the nozzle 8 is provided with a kind of inclined cutwater 10 by means of which the danger of the nozzle being carried away in case of collision with an obstacle is reduced, while at the same time the nozzle is not liable to deflect air from the ship's side to the space in front of the water conduit 3.

In these various forms of construction the plates forming the nozzle are preferably curved or convex at 11 as shown in Fig. 12. During the slow movement of the ship when it starts, the said curved or convex part 11 supplements the cutting action of the cutwater 10 by preventing air from passing to the space in front of the perforated plate or the orifice of the conduit 3.

Figs. 13, 14 and 15 illustrate the application of the method in such a manner, that the air and water are separated inside the ship before the water reaches the apparatus in connection with which it is to be used. For this purpose separators 12 can be used in which the air is separated from the water. As shown in the drawing the frothy water passes into a vessel 12 from the bottom of which the water flows in the direction indicated by the arrow 13, while the air ascends in the direction indicated by the arrow 14. Analogous separators can be produced in the manner illustrated in Figs. 14 and 15 by simply constructing the water conduit so that it extends downwards from the orifice in the side of the ship.

Figs. 16 to 22 illustrate arrangements which are more particularly designed for protecting the screw-propeller and the steering gear from air. In the arrangement shown in Figs. 16 and 17 blades 15 of more or less curved shape and equaling in width the thickness of the air layer are so arranged that they cause the air to pass in an upward direction before it can come into contact with the rear part of the vessel. As shown in Fig. 17ª these blades can be in the shape of troughs 16 so as to facilitate the ascent of the air, but at the same time to absolutely compel the said ascent. In the example shown in Figs. 18 and 19 the air is conducted to the water surface by means of grooves 17 in the hull of the vessel. This arrangement has the advantage of preventing the formation of eddies at the sides of the vessel and of dispensing with the use of projecting parts. As shown in Fig. 20 the said grooves can be protected by means of netting or the like 18, which facilitates and accelerates the separation of the ascending air from the water. In the example shown in Figs. 21 and 22 blades 19 are placed in the direction in which the water flows past the ship. Underneath these blades are situated orifices 20 communicating with conduits 21 through which the air contained in the water can ascend. The blades thus arranged offer no resistance to the movement of the ship or to the flow of water to the propeller, but they momentarily interrupt the ascent of the air and cause the latter to enter the conduits 21. The water does not follow the air in its passage through the said conduits and the flow of the water is not interrupted.

The different ways of carrying out the invention hereinbefore described can, of course, be combined, that is to say used in connection with one vessel; they are particularly applicable to existing ships in connection with which the use of an air-layer for facilitating propulsion would be impracticable without the auxiliary arrangements described.

What I claim is:

1. The process for protecting the machinery, steering gear, propelling gear and other apparatus from air and froth on board ships, the propulsion of which is facilitated by introducing a layer of air between the ship's hull and the water, consisting in deflecting the air injected into the water from the paths pursued by the water flowing to the apparatus to be protected, substantially as described.

2. The process for protecting the machinery, steering gear, propelling gear and other apparatus from air and froth on board ships, the propulsion of which is facilitated by introducing a layer of air between the ship's hull and the water, consisting in deflecting the air injected into the water from the paths pursued by the water flowing to the apparatus to be protected and directing the air in a certain manner by aid of the force which causes the air to ascend, substantially as described.

3. The process for protecting the machinery, steering gear, propelling gear and other apparatus from air and froth on board ships, the propulsion of which is facilitated by introducing a layer of air between the ship's hull and the water consisting in using blades and wings conveniently shaped in order to deflect the air and froth from the places to be protected, substantially as described.

4. The process for protecting the machinery, steering gear, propelling gear and other apparatus from air and froth on board ships, the propulsion of which is facilitated by introducing a layer of air between the ship's hull and the water consisting in causing the air injected into the water to be deflected from the parts through the agency of deflecting wings said wings forming an inclined cut-water.

5. The process for protecting the machinery steering gear, propelling gear and other apparatus from air and froth on board ships, the propulsion of which is facilitated by introducing a layer of air between the ship's hull and the water, consisting in causing the air injected into the water to be deflected from the parts through the agency of deflecting wings and blades and in causing obstacles to be deflected off.

6. The process for protecting the machinery, steering gear, propelling gear and other apparatus from air and froth on board ships the propulsion of which is facilitated by introducing a layer of air between the ship's hull and the water consisting in causing the air injected into the water to be deflected from the parts through the agency of deflecting wings and forming the said wings with a channel adapted to direct the air and froth substantially as described.

7. The process for protecting the machinery, steering gear, propelling gear and other apparatus from air and froth on board ships, the propulsion of which is facilitated by introducing a layer of air between the ship's hull and the water, consisting in causing the air injected into the water to be deflected from the parts through the agency of wings and blades in the direction in which the water flows and arranging underneath said wings and blades orifices communicating with conduits for the ascension of the air, substantially as described.

In witness whereof I have hereunto set my hand in presence of two witnesses.

GUSTAVE QUANONNE.

Witnesses:
GEORG BEDE,
GREGORY PHELAN.